United States Patent [19]
Arutt et al.

[11] 3,992,606
[45] Nov. 16, 1976

[54] PORTABLE HEAT SEALER

[75] Inventors: Kennuth Arutt, Hewlett Harbor; William Hall, N. Babylon, both of N.Y.

[73] Assignee: Cosmos Electronic Machine Corporation, Farmingdale, N.Y.

[22] Filed: Sept. 18, 1975

[21] Appl. No.: 614,271

[52] U.S. Cl. ............................ 219/243; 53/DIG. 2; 93/DIG. 1; 156/515; 156/583
[51] Int. Cl.² ............................................. H05B 1/00
[58] Field of Search ........... 219/243; 53/33, DIG. 2; 93/DIG. 1; 156/515, 583, 273, 306; 100/93 P

[56] References Cited
UNITED STATES PATENTS

| | | | |
|---|---|---|---|
| 2,732,881 | 1/1956 | Anderle | 156/515 X |
| 3,243,574 | 3/1966 | Blythe et al. | 156/583 X |
| 3,447,994 | 3/1966 | Abramson et al. | 156/583 X |
| 3,522,133 | 7/1970 | Gross | 156/515 |
| 3,822,164 | 7/1974 | Guido et al. | 156/306 X |

*Primary Examiner*—C. L. Albritton
*Attorney, Agent, or Firm*—Robert D. Farkas

[57] ABSTRACT

A portable dielectric Radio Frequency generator adapted with wheels and a flexible output cable through which a suitable range of Radio Frequency currents pass. A levelable press applies Radio Frequency voltage to a plastic load and is adapted with a set of various shaped quick mounting electrodes and control circuitry. When the generator is moved to a work site, the press is stored in a holding device facilitating ease of transportation. The press provides suitable compressive forces on the electrode system selected by utilizing a spring compressed by a hand operated cam.

10 Claims, 3 Drawing Figures

3,992,606

PORTABLE HEAT SEALER

BACKGROUND OF THE INVENTION

THE FIELD OF THE INVENTION

This invention relates to sealing or welding of plastic sheets or films. Radio Frequency voltage is applied to metallic highly conductive electrodes placed on opposite outer faces of two or more suitable juxtaposed plastic films. The Radio Frequency field created within the plastic tends to electronically excite those molecules within the plastic that demonstrate high dielectric polar moments. The rapid alternate frequencies produce sufficient mechanical agitation of the dipolar molecules, resulting in elevated temperatures at the interface of the film layers. Melting or fusion results. The most common materials demonstrating satisfactory loss tangents include polyvinyl chloride, polyurethane, polyamides, and similar plastic films or coatings on suitable woven or non-woven fabric substrates. The heating process is confined to the area confined by the surface of plano-parallel electrodes exerting, concurrently, compressive forces on the plastic load. As the plastic materials located between opposed sealing electrodes becomes heated, a plastic flow is created forcing some molten material outwards from between the electrodes' faces. The void formed by the extrudate is filled by one or both electrodes sinking into the faces of the films. A press supplies the compressive forces on opposing electrodes and permits the electrode faces to be urged together during the extruding phase. This phenomenon, commonly called press "follow through," is required to successfully co-mingle the molten interstitial faces between films to be welded, and to limit the possibility of arcing or breakdown due to the voids created when the extrudate leaves the area defined by the electrode sealing surfaces. The inertia and speed of travel of the press and electrode system must be such that controlled compressive forces of substantial magnitude are maintained at all times that the plastic load in the sealing area is liquid. This eliminates the practicability of utilizing a press which derives its compressive force by use of manual pressure. The shear forces vary during the heating cycle dependent upon the temperature created by the dielectric field. Accordingly, the press "follow through" must proceed at a sufficiently high speed to accommodate various heating rates. Coincidental with the press motion upon liquifaction of the load is the need to maintain parallelism between the electrode faces. Arcing or breakdown of the load tends to occur when a portion of an electrode face sinks inordinately into the load. The voltage stress in the work load increases in those areas in which the plastic load is thinned out excessively, resulting in the increased probability of the occurrence of arcs.

The application of the Radio Frequency voltage to the work must follow the point in time at which the work is under compression by the electode faces. Premature application of the Radio Frequency voltage results in arcing at those points along the electrode face at which air gaps appear between the sealing surface of the electrode and the mating surface of the plastic load.

DESCRIPTION OF THE PRIOR ART

The prior art abounds with that class of devices employing Radio Frequency generators utilized to provide an energy field across plastic loads which are to be sealed together in discreet areas. Virtually all dielectric heat sealing machinery employ pneumatic or hydraulically operated presses permanently and rigidly coupled to electronic generators. These devices are virtually incapable of use in the field to effectuate repairs or critical on-site seals because of their bulk and weight. The need for compressed air or motor operated hydraulic pumps add to the weight and bulk of such equipment, further hindering the practical use in field locations.

Most seals involving repairs to large plastic structures require that the press and associated electrode system be placed in a position such that the structure is not substantially moved or disturbed while performing the sealing operation. Presses heretofore require work placement at the press location necessitating substantial relocation and placement of the work load to accommodate to the location of the press structure. Electrodes have been pseudopermanently attached to the press platens limiting the size and shape of the applied seal due to the inability to conveniently and rapidly substitute various electrode configurations.

SUMMARY OF THE INVENTION

A portable Radio Frequency generator comprising a line voltage operated power supply which supplies high voltage direct current to a master oscillator power amplifier, Class C, self excited vacuum tube, oscillator. The power supply is initially energized by closing a remote press operated position dependent switch, and is de-energized when a preset interval timer runs its course. The remote start-up switch is adapted with a linkage coupled to a part of the moving structure of the portable spring biased press. The spring is biased by the manual rotation of a cam. The spring then exerts compressive forces on the press platens which are adapted to receive a variety of "snap-in" electrodes. The Radio Frequency generator is housed within an enclosure having suitable wheels mounted therebelow. The portable press is stored in a holding device fastened to the Radio Frequency generator facilitating convenient transport of the entire heat sealing apparatus. A flexible coaxial conductor couples the Radio Frequency generator to the press. A flexible power cable provides line voltage to the Radio Frequency generator's power supply upon closing of the press actuated position sensitive switch.

A primary object of the instant invention is to provide a conveniently operated inexpensive portable electronic heat sealing device.

Another object is to provide a Radio Frequency generator adapted with a portable press holding device facilitating simultaneous unitary relocation.

Still another object is to provide a portable heat sealing press remotely located from a Radio Frequency generator.

A further object is to provide a portable press adapted to supply compressive forces derived from the manual storage of mechanical energy.

Another object is to provide a heat sealing press capable of exerting continuous compressive forces on the load without the need for compressed air or hydraulic power supplies.

Still another object is to provide a means to initiate the appearance of Radio Frequency voltage at the electrodes upon a predetermined amount of loading displacement of the electrode faces.

A further object is to provide a heat sealing press which can be operated at grade level or at any convenient height compatible with the location of the site of the desired sealing area.

Another object is to provide a portable press structure which can be operated horizontally or vertically.

Still another object is to provide a portable Radio Frequency energized press adapted to receive electrodes mounted in quick coupling and decoupling fashion to the press platens.

These objects, as well as other objects of this invention, will become readily apparent after reading the following description of the accompanying drawings.

DESCRIPTION OF THE PREFERRED EMBODIMENT

Figure 3:
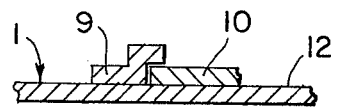
FIG. 3 is a cross sectional view taken along line 3—3 viewed in the direction of arrows 3—3 as shown in FIG. 1.

The structure and method of fabrication of the present invention is applicable to a portable Radio Frequency generator providing suitable Radio Frequency currents through a flexible coaxial cable to a lightweight portable hand operated press. The generator is adapted with undercarriage wheels promoting transportation over relatively flat terrain and is further adapted with a holding device which suitably contains the press whilst fastening it to an outer wall of the generator. The press is removed from its holding device and positioned to perform its sealing task by resting the press' lowermost bed-like structure on any suitable generally horizontal surface. The coaxial cable is of sufficient length to permit convenient operation and relocation of the portable press at extended heights or below grade levels and over a wide arcuate range of distance from the pseudo-stationary generator. Upon completion of a remote sealing task, the press is stored into the generator press holding device and the entire assembly is capable of being transported to a new work site as an integral portable unit. Suitable cable storage compartments are provided.

The Radio Frequency generator is comprised of a high voltage direct current power supply intermittantly energized for controlled time periods equal to the desired sealing time cycle. The high voltage power supply in turn energizes the anode of a triode vacuum tube which, in conjunction with a variety of reactive components, produces a Radio Frequency oscillator current within a tank circuit operating at 27.12 Mhz. An output circuit coupled to the tank circuit feeds the coaxial cable input.

The Radio Frequency energy cycle is initiated when a Radio Frequency selector switch located on the Radio Frequency generator is thrown to the operate position and a momentary switch, located at the portable press, is depressed by the press motion reflecting compressive forces being exerted on the plastic work load. The generator toggle switch serves as a safety switch preventing inadvertant application of Radio Frequency voltage to the portable press upon accidental depression of the momentary switch during periods that the portable press is being relocated to a new work site. The Radio Frequency energy continues to exist at the portable press for a period of time determined by an interval timer which has been manually preset for a predetermined time period. The control circuit involves a holding relay which prevents the re-energization of the high voltage direct current power supply until such time that the prior Radio Frequency cycle has been completed and the holding relay has been de-energized due to the release of the press momentary switch at any point in time after the previous Radio Frequency cycle has been completed. Accidental double seals are avoided by requiring the press to be unclamped between each successive seal.

The press is comprised of a generally rectangular base structure which is adapted to receive, selectively, a variety of bed plates fastened at one end thereof. A pivot assembly is located approximately midway along the length of the rectangular base while a compression spring is centered about a pilot rod at the other free end of the base. An upper press beam, having approximately the same length as the base plate, is fastened pivotably to the centermost pivot point fastened to the base plate. The end of the upper press beam located nearest the lowermost bed plate is adapted to pivotably engage a suitable Radio Frequency insulating material positioned over the lowermost bed plate. A number of detachable quick connecting upper electrodes engage the lowermost surface of the insulator. The Radio Frequency voltage available at the output end of the coaxial cable is connected to the lowermost bed plate and the upper electrode. The other free end of the upper press beam is adapted to mount the pivot of a non-concentric circular cam whose surface contacts a bearing washer riding on the upper end of the aforementioned spring. A lever arm is fastened to the cam such that rotation of the lever arm about the uncentered axis of the cam causes the cam face to bear in varying degrees of displacement upon the uppermost lateral surface of the washer. Rotation of the lever in one direction causes the cam to compress the spring, forcing the cam end of the upper beam to seperate further from the uppermost surface of the base plate. The electrode end of the upper beam is forced to descend simultaneously downwards towards the bed plate. If the work load varies in thickness from seal to seal or during a seal, variations in the work height are made insignificant by virtue of the pivotable assembly fastening the upper electrode to the upper beam. Parallelism, therefore, is always maintained between the upper electrode and the upper surface of the lowermost bed. The weight, length of beam, choice of structural materials, in combination with the inertial characteristics of the spring, permits the rapid motion that the press electrode system must possess, enabling the upper electrode to follow faithfully the depression rate in the uppermost face of the load caused by extruding molten plastic between the loads at a rapid rate.

Figure 1:
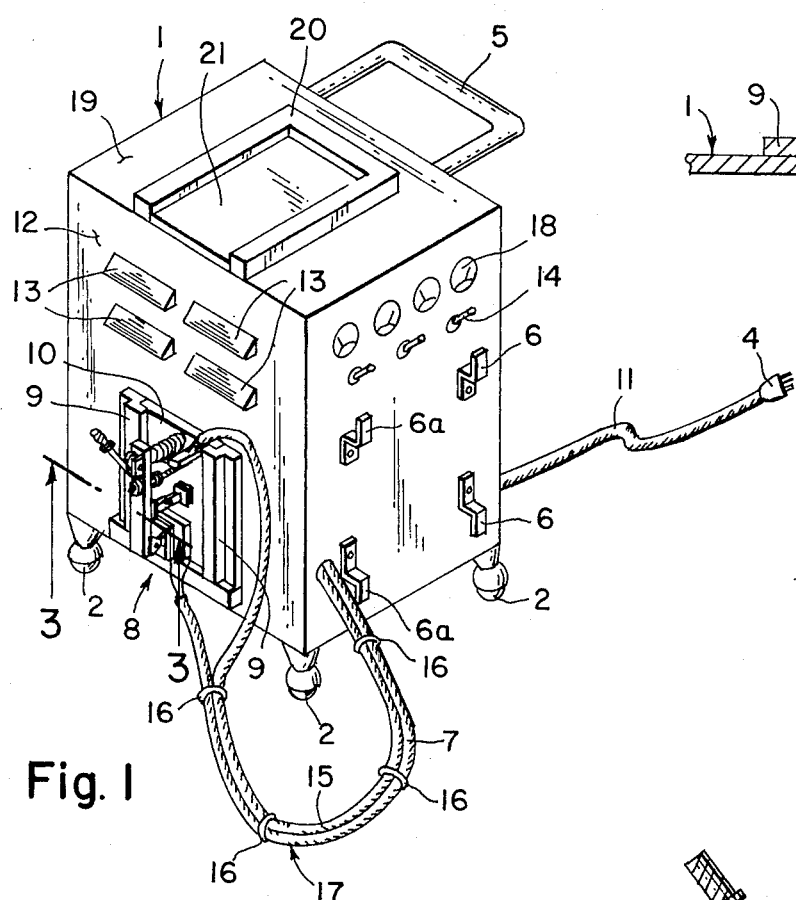
FIG. 1 is a perspective view of the Radio Frequency generator, connecting cables, holding device, portable press, and line cord.

Now referring to the Figures, and more particularly to the embodiment illustrated in FIG. 1 showing the Radio Frequency generator enclosure 1 supported by four swivel wheels 2. Flexible line cable 11 is utilized to provide electrical energy from a conventional household utility outlet which is terminated in plug 4. A handle 5 attached to the upper wall of the generator enclosure 1 enables the user to conveniently pull or push the assembly along the ground. Cable clips 6 are fastened to an outer wall of the generator enclosure providing a means of storing the line power cord 11 when the portable assembly is being moved about or not in use. Coaxial cable 7 couples the output of the Radio Frequency generating compartment, not shown, located within the enclosure to the portable press assembly 8. Mounting clips 9 support the portable press in a storage position on a vertical surface 12 of the generator housing 1. The portable press is adapted with a base plate 10 which is generally rectangular in shape captured by the mounting clips 9 as illustrated in FIG. 3. Louvers 13 provide communication to the atmosphere ventilating the internal electrical components within the enclosure. Mounting clips 6a are utilized to store a composite cable 17 when the composite cable is not extended. Switch 14 closes an enabling control circuit within the generator such that the internal power supply, not shown, may be energized only when switch 14 is thrown into the operate position. Coaxial cable 7 is combined with a shielded control cable 15 forming the composite cable 17. Cable straps 16 bind cable 15 to coaxial cable 7. Shielded control cable 7 is utilized to provide the control circuit, housed within the generator enclosure, with position information concerning the closure of the press assembly 8. Interval timer 18 controls the duration of the energization of the power supply, not shown, located within the generator housing 1. The power supply energization period is initiated by the concurrent closing of enabling switch 14 and a press position sensing switch, not shown, and concluded at a point in time determined by the time interval selected by presetting the timer 18. The generator enclosure 1 has its uppermost surface 19 equipped with a U-shaped nesting frame 20 whose cut out interior portion 21 is adapted to receive the base plate 10 of the portable press 8. The horizontal surface 19 thus provides a convenient though nonexclusive use location for the portable press assembly 8.

An additional U-shaped nesting frame, similar to frame 20, may be fastened to the vertical wall of generator enclosure 1 opposite the vertical surface in which cable storage mounting clips 6 and 6a are located. This additional U-shaped nesting frame, not shown, may be arranged at any convenient height permitting the operation of the portable press 8 in a vertical position.

Figure 2:
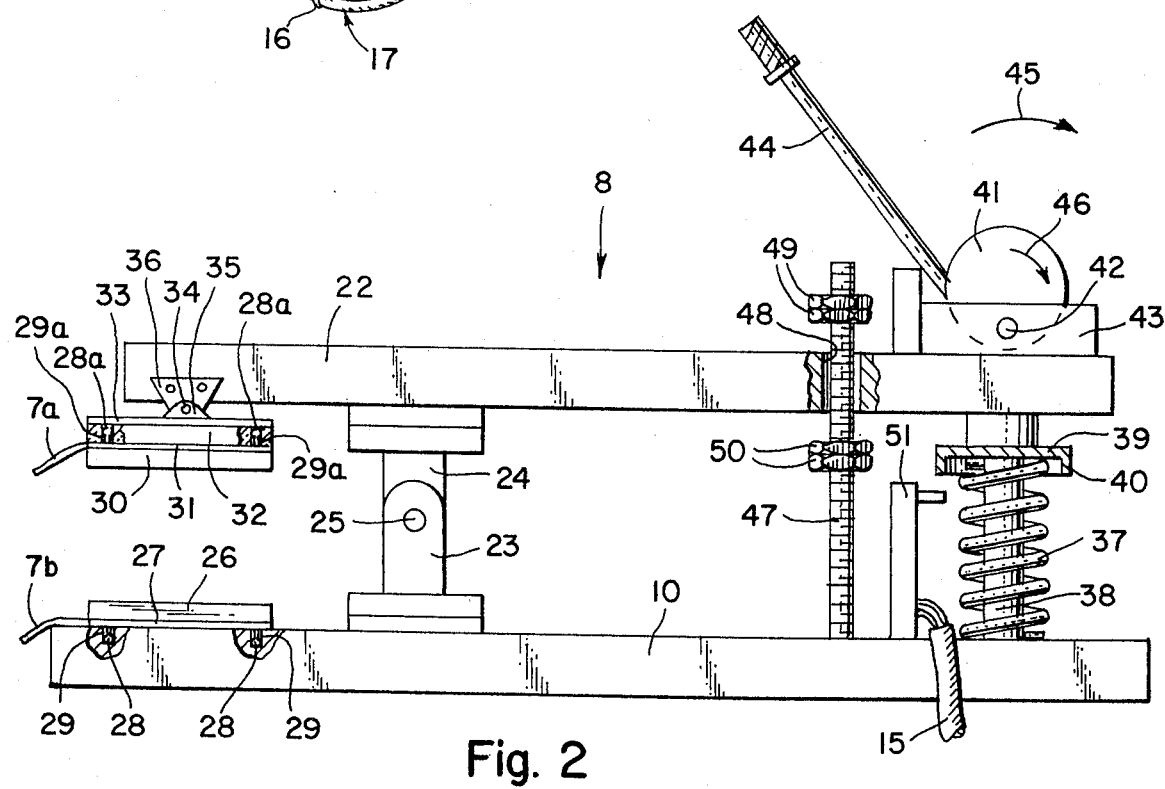
FIG. 2 is a side elevation view of the portable press.

FIG. 2 illustrates the portable manually operated press 8 connected to the coaxial cable 7 shown in FIG. 1. Base plate 10 is generally rectangular in shape having a width somewhat greater than the width of upper beam member 22. Support pivot pad 23 is fastened at its base to the upper surface of base plate 10. Pivot pad 24 depends from the lowermost lateral surface of the upper beam 22. Both support pads 23 and 24 are pivotably connected at a pivot point 25 facilitating the rotation of the upper beam about the pivot point 25. Lower electrode 26 rests upon a conductive metallic sheet 27 which in turn is connected to the outer coaxial conductor 7b of the coaxial cable 7, as shown in FIG. 1. The other end of the outer conductor of the coaxial cable 7 is grounded at the generator housing 1 as shown in FIG. 1. Expandable "banana" pins 28 fastened to lower electrode 26, engage holes 29 in the base plate 10 and secure the lower electrode 26. Interchangability of various shaped electrodes is facilitated by rapid insertion and removal of the connecting pins 28 of the lower electrode 26 into the holes 29 in the base plate 10. In similar fashion, upper electrode 30 engages conductive sheet 31 which in turn is electrically connected to the inner conductor 7a of the coaxial cable 7 illustrated in FIG. 1. Expandable "banana" pins 28a engage securing holes 29a which are located in an insulating material 32. A metallic support plate 33 is pivotably secured to pivot point 34 by pivot pad 35. Pivot pad 36 supports pivot point 34 at its apex and is secured to the undermost lateral surface of upper beam 22 at its base. Thus, the lowermost lateral surface of electrode 30 is free to remain parallel with the uppermost surface of lower electrode 26 as upper beam 22 rotates about pivot point 25. A plastic load interposed between the electrodes' faces maintains the parallelism of the faces. Compression spring 37 is centered about post 38 which is permanently secured to the uppermost surface of base plate 10. Washer 39 has a vertical hollow skirt 40 depending below its lowermost lateral surface. Spring 37 is confined within skirt 40 in its uppermost regions. Cam 41 is eccentrically pivoted about pivot point 42 which is located at the apex of pivot pad 43 fastened to the uppermost lateral surface of upper beam 22. When hand lever 44, which is fastened to cam 41, is rotated in the direction of arrow 45 about pivot point 42, the surface of cam 41 is rotated in the direction of arrow 46 such that the surface of cam 41 engages the uppermost lateral surface of washer 39. Further rotation of cam 41 causes spring 37 to compress. A vertical force is imparted through cam 41 to pivot point 42 causing the end of upper beam 22 at which the upper electrode 30 is fastened to descend downward towards the lower electrode 26. The compressive force initiated by compressing spring 37 results in a differing compressive force at the electrode faces which is dependent upon the location of pivot point 25 along a length defined between pivot points 34 and 42. If pivot point 25 is located midway between pivot point 34 and pivot point 42, then the compressive forces exerted to the plastic load at the die faces equals the forces exerted by spring 37. Displacing laterally pivot pads 23 and 24 and their coterminal pivot point 25 to any location other then a central location causes a modification in the amount of force exerted upon the electrodes. Loads of various thicknesses may be accommodated by shifting pivot point 25 laterally. Pivot pads 23 and 24 terminate at their bases in T cross-section shaped bolts, not shown, whose heads are anchored in T-shaped slots machined along the length of both base plate 10 and upper beam 22. Placement of pivot point 25 along the slots, not shown, in obtained by loosening the T-shaped securing bolts, sliding pivot pads 23 and 24 to the desired location, and tightening the T-shaped securing bolts. The press' ability to follow faithfully the depression created by the liquifaction of the plastic sections compressed by the electrode faces, as well as the absolute amount of compressive forces exerted by the manual preloading of spring 37, are altered when the position of pivot point 25 is changed. Threaded rod 47 passes through hole 48 in the upper beam 22 having locking nuts 49 positioned near the free end thereof. The lowermost surface of the lowermost nut contacts the uppermost lateral surface of upper beam 22 prohibiting the indefinite downward motion of the electrode end of upper beam 22 for those sealing situations in which the press' compressive ability must be halted when the work thickness falls below a predetermined minimum. In similar fashion, stop nuts 50 prevent the cam end of upper beam 22 from descending to a height which causes the electrode spacing to become inordinately great. Stop nuts 49 and 50 control the range of motion seperating the electrodes.

Momentary switch 51 engages skirt 40 when washer 39 is sufficiently depressed by the face of cam 41. The switch 51 changes its electrical state signalling the position of the electrodes at the other end of the press assembly. Shielded control cable 15 is connected to the terminals of switch 51 at one end and the internal control circuitry housed within the generator enclosure 1, as shown in FIG. 1, at the other end. The control circuit is arranged in conventional fashion such that a Radio Frequency voltage is made available between wires 7a and 7b when momentary switch 51 is depressed and the enabling switch 14, shown in FIG. 1, are both closed. After timer 18, shown in FIG. 1, has run out and terminated the energization of the power supply within the generator enclosure, momentary switch 51, by remaining closed, prevents re-energization of the power supply until such time that switch 51 becomes undepressed by raising the electrodes in preparation for a subsequent sealing operation. Thus, inadvertant repeated sealing cycles are avoided.

FIG. 3 illustrates a mounting clip 9 affixed to the vertical surface 12 is of a side wall of the generator enclosure 1, as shown in FIG. 1. A portion of an edge of base plate 10 is shown captured by mounting clip 9 such that the base plate may slide along the length of mounting clip 9 whilst still remaining captured thereby and in intimate contact with surface 13. A simple sliding motion withdraws press assembly 8, as shown in FIG. 1, from mounting clips 9 from its securely mounted transporting and storage position, as shown in FIG. 1.

One of the advantages is a conveniently operated inexpensive portable electronic heat sealing device.

A further advantage is a Radio Frequency generator adapted with a portable press holding device facilitating simultaneous unitary relocation.

Another advantage is a portable heat sealing press remotely located from a Radio Frequency generator.

Still another advantage is a portable press adapted to supply compressive forces derived from the manual storage of mechanical energy.

A further advantage is a heat sealing press capable of exerting continuous compressive forces on the load without the need for compressed air or hydraulic power supplies.

Another advantage is a means to initiate the appearance of Radio Frequency voltage at the electrodes upon a predetermined amount of loading displacement of the electrode faces.

Still another advantage is a heat sealing press which can be operated at grade level or at any convenient height compatible with the location of the site of the desired sealing area.

A further advantage is a portable press structure which can be operated horizontally or vertically.

Another advantage is a portable Radio Frequency energized press adapted to receive electrodes mounted in quick coupling and decoupling fashion to the press platens.

Thus, there is disclosed in the above description and in the drawings, an embodiment of the invention which fully and effectively accomplishes the objects thereof. However, it will be apparent, to those skilled in the art, how to make variations and modifications to the instant invention. Therefore, this invention is to be limited not by the specific disclosure herein, but only by the appending claims.

The embodiment of the invention in which an exclusive privilege or property is claimed is defined as follows:

I claim:

1. A portable heat sealer comprising a Radio Frequency voltage generator housed within an enclosure, said enclosure having a horizontal lateral supporting structure, a plurality of supporting casters securedly fixed to the lowermost lateral surface of said supporting structure, the input terminals of said Radio Frequency voltage generator electrically connected to a flexible input line voltage power cable, the output terminals of said Radio Frequency voltage generator electrically connected to the input end of a flexible power output cable, a portable remote operating heat sealing press electrically connected to the output end of said flexible power output cable, means to temporarily secure in a storage position said portable remote operating heat sealing press to the exterior of said enclosure.

2. The portable heat sealer as claimed in claim 1 further comprising means to store said flexible input line voltage power cable on an exterior surface of said enclosure.

3. The portable heat sealer as claimed in claim 1 further comprising means to store said flexible power output cable on an exterior surface of said enclosure.

4. The portable heat sealer as claimed in claim 1 wherein said portable remote operating heat sealing press further comprises a horizontal lateral rectangular base plate, a generally rectangular upper beam whose length is substantially equal to the length of said base plate located above and substantially parallel to said base plate, an upper pivot arm slidably fastened along a first line, said first line located along the longitudinal axis on the lowermost horizontal lateral surface of said upper beam, means to selectively secure said upper pivot arm to a point along said first line, a lower pivot arm slidably fastened along a second line, said second line located along the longitudinal axis on the uppermost horizontal lateral surface of said base plate, means to selectively secure said lower pivot arm to a point along said second line, said first line and said second line lying in a plane normal to said uppermost lateral surface of said base plate, said plane intersecting the longitudinal axis of said base plate at a point substantially equidistant from the longitudinal side edges thereof, said plane intersecting the longitudinal axis of said upper beam at a point substantially equidistant from the longitudinal side edges thereof, said upper pivot arm and said lower pivot arm pivotably engaged along a first pivot line transverse to said plane and located intermediate said lowermost lateral surface of said upper beam and said uppermost lateral surface of said base plate, a helical spring whose axis is normal to said uppermost lateral surface of said base plate and lying in a third line within said plane, said third line located at a point approximating one end of said upper beam, the lowermost end of said spring in touching engagement with said uppermost lateral surface of said base plate, the uppermost end of said spring supporting a cam face pressure bearing plate, a cam pivot arm fastened to said upper beam along said third line, said cam pivot arm pivotably fastened to an eccentric circular cam along a second pivot line normal to said plane and said third line, said second pivot line intersecting said third line, a manual press operating handle fixedly secured to said eccentric cam extending radially outwardly therefrom having a longitudinal axis extending through said second pivot line, said longitudinal axis of said press operating handle lying in said plane, the periphery of said eccentric cam in touching engagement with the uppermost lateral surface of said cam face pressure bearing plate upon rotating said press operating handle about said second pivot line, an upper ram head pivot arm fixedly secured to said lowermost lateral surface of said upper beam at a point approximating the other end of said upper beam, a lower ram head pivot arm fixedly secured to a ram head insulator supporting plate, said upper and lower ram head pivot arms pivotably engaged along a third pivot line normal to said plane located at a distance normal from said lowermost lateral surface of said upper beam intermediate the distance separating said first pivot line and said lowermost lateral surface of said upper beam along a fourth line normal to said lowermost lateral surface of said upper beam lying in said plane, a plate of insulating material fixedly secured to the lowermost lateral surface of said ram head insulator supporting plate, an upper metallic electrode adapted to temporarily engage said plate of insulating material, a lower metallic electrode adapted to temporarily engage the uppermost lateral surface of said plate substantially juxtaposed to the lowermost lateral surface of said upper electrode, said first pivot line intermediate the distance separating said second and third pivot lines, said upper electrode and said lower electrode separately electrically connected to individual conductors at the output end of said flexible power output cable.

5. The portable heat sealer as claimed in claim 4 further comprising a threaded press motion restricting rod having one end fixedly secured to said uppermost lateral surface of said base plate whose longitudinal axis lies in said plane parallel to said third line, said threaded press motion restricting rod adapted with an internally threaded first nut threaded thereupon located between said uppermost lateral surface of said base plate and said lowermost lateral surface of said upper beam, said threaded press motion restricting rod adapted with an internally threaded second nut threaded thereupon located above the uppermost lateral surface of said upper beam, the axis of said threaded press motion restricting rod located intermediate said first pivot line and said third line.

6. The portable heat sealer as claimed in claim 4 further comprising a momentary switch whose operating depressable lever is depressed upon the peripheral surface of said eccentric cam engaging the uppermost lateral surface of said cam face pressure bearing plate, a flexible control circuit cable interconnecting the terminals of said momentary switch and the control circuitry components of said Radio Frequency voltage generator, said flexible control circuit cable adapted to combine with said flexible power output cable in touching engagement along the lengths thereof.

7. The portable heat sealer as claimed in claim 4 further comprising a nesting frame whose interior cut out portion substantially coincides with the peripheral edges of said base plate, said nesting frame fastened to the uppermost lateral horizontal surface of said enclosure.

8. The portable heat sealer as claimed in claim 4 further comprising means to secure the lowermost lateral surface of said base plate to a vertical surface of said enclosure such that said first line is substantially parallel to a plane defined by the uppermost lateral surface of said enclosure.

9. The portable heat sealer as claimed in claim 4 further comprising a metallic conducting sheet fixedly secured to the lowermost lateral surface of said plate of insulating material and electrically connected to a conductor of said flexible output cable.

10. The portable heat sealer as claimed in claim 4 wherein said upper and lower pivot arms are permanently non-slidably affixed respectively to said lowermost lateral surface of said upper beam and to said uppermost lateral surface of said base plate such that said first pivot line is fixedly located intermediate said second and third pivot lines.

* * * * *